(12) United States Patent
Juhl

(10) Patent No.: US 8,015,719 B2
(45) Date of Patent: Sep. 13, 2011

(54) ELECTRICIANS SQUARE

(76) Inventor: Eric Juhl, San Leandro, CA (US)

( * ) Notice: Subject to any disclaimer, the term of this patent is extended or adjusted under 35 U.S.C. 154(b) by 236 days.

(21) Appl. No.: 12/466,121

(22) Filed: May 14, 2009

(65) Prior Publication Data
US 2010/0287785 A1 Nov. 18, 2010

(51) Int. Cl.
*B43L 7/14* (2006.01)
*G01B 3/02* (2006.01)
(52) U.S. Cl. .......... 33/427; 33/480; 33/DIG. 10; 33/464
(58) Field of Classification Search .............. 33/419, 33/427, 429, 452, 464, 479, 480, 481, 483, 33/485, 490, 491, DIG. 9, DIG. 10; D10/62, D10/65
See application file for complete search history.

(56) References Cited

U.S. PATENT DOCUMENTS

| | | | |
|---|---|---|---|
| 1,379,253 A | 5/1921 | Dorney | |
| 1,509,703 A | 9/1924 | Bourgeois | |
| 1,523,265 A | 1/1925 | Hobbs | |
| 2,199,235 A * | 4/1940 | Ashel | 33/490 |
| 2,448,440 A | 8/1948 | King | |
| 2,536,378 A * | 1/1951 | Lee | 33/667 |
| 2,540,032 A | 1/1951 | Johnson et al. | |
| 2,733,517 A * | 2/1956 | Gjersoe | 33/666 |
| 2,833,041 A | 5/1958 | Reno | |
| 3,013,340 A * | 12/1961 | Fairbanks | 33/679 |
| D195,356 S | 6/1963 | Keszler | |
| D206,349 S | 11/1966 | Barbee | |
| 3,842,510 A | 10/1974 | Elliott | |
| D233,695 S | 11/1974 | Payne et al. | |
| 4,228,592 A | 10/1980 | Badger | |
| 4,301,600 A | 11/1981 | Charnley | |
| 4,584,780 A | 4/1986 | Pressey | |
| 4,611,407 A * | 9/1986 | van Gorp | 33/471 |
| 4,697,351 A | 10/1987 | Hopfer | |
| 4,793,069 A | 12/1988 | McDowell | |
| 4,837,939 A | 6/1989 | Pullen | |
| 5,339,530 A | 8/1994 | Wright | |
| 5,383,281 A | 1/1995 | Monger | |
| 5,388,339 A | 2/1995 | Roach et al. | |
| 5,577,328 A | 11/1996 | Kerry, Sr. | |
| 5,778,547 A * | 7/1998 | Wolken | 33/427 |
| 6,119,354 A | 9/2000 | Hansen | |
| 6,134,795 A | 10/2000 | Hitchcock | |
| D454,312 S * | 3/2002 | Anderson et al. | D10/65 |
| D460,008 S | 7/2002 | Cina | |
| D475,307 S | 6/2003 | Grendahl | |
| D489,960 S | 5/2004 | Grendahl | |

(Continued)

OTHER PUBLICATIONS

Juhl, U.S. Appl. No. 29/339,819, filed Jul. 8, 2009.

*Primary Examiner* — R. A. Smith
(74) *Attorney, Agent, or Firm* — Thorpe North & Western LLP

(57) ABSTRACT

A tool for measuring and marking conduit entry holes in a distribution box. The tool includes a rectangular ruler having a short edge attachment groove proximal to a short edge of the ruler which is configured for engagement by a locking assembly. The tool further includes a handle having a tip face and a side face, and a side face locking assembly that is slidably engaged into the short edge attachment groove. Engagement of the side face locking assembly into the short edge attachment groove couples the handle to the ruler and facilitates the measurement and marking of a depth dimension and a lateral location of one or more conduit entry holes on the distribution box.

22 Claims, 13 Drawing Sheets

U.S. PATENT DOCUMENTS

| | | |
|---|---|---|
| 6,785,976 B1 | 9/2004 | Morehouse |
| 6,907,674 B2 | 6/2005 | Grendahl |
| 7,014,152 B2 | 3/2006 | Grendahl |
| D546,213 S | 7/2007 | Daley |
| D547,148 S | 7/2007 | Jordan et al. |
| 7,254,898 B1 * | 8/2007 | Armstrong ................ 33/464 |
| 7,337,550 B2 * | 3/2008 | Marcus ................ 33/480 |
| 7,455,266 B2 | 11/2008 | Faircloth |
| D625,624 S * | 10/2010 | Juhl ................ D10/65 |
| 2004/0003507 A1 | 1/2004 | Jordan et al. |
| 2004/0031166 A1* | 2/2004 | Ekdahl et al. ................ 33/759 |
| 2007/0220764 A1* | 9/2007 | Wolken ................ 33/427 |

* cited by examiner

RELATED ART

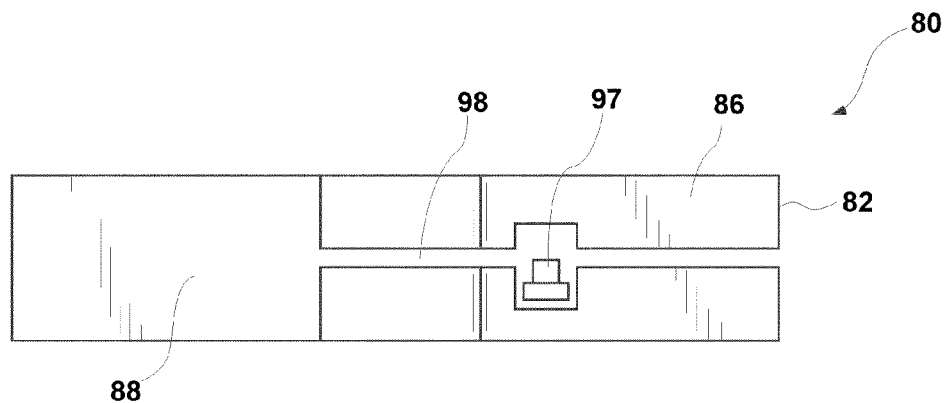
FIG. 4c
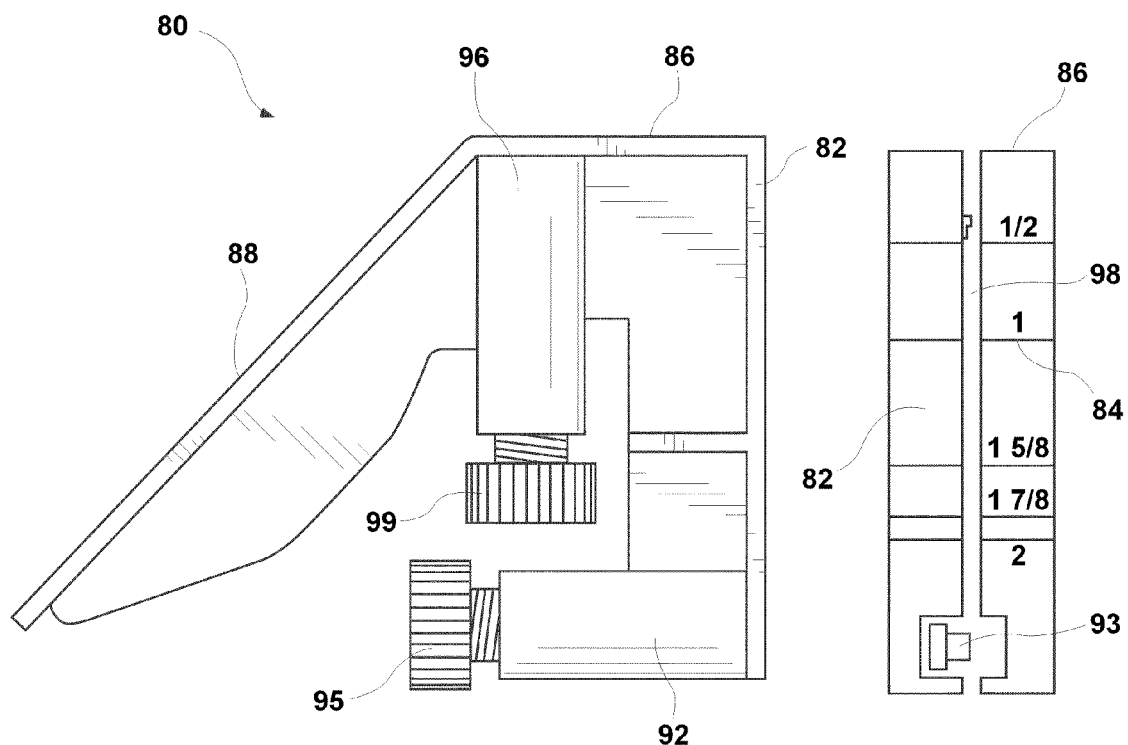
FIG. 4a          FIG. 4b

ELECTRICIANS SQUARE

FIELD OF THE INVENTION

The field of the invention relates generally to measurement devices, and more particularly to measurement and marking devices that can measure and mark the locations of conduit entry holes into an electrical distribution box.

BACKGROUND OF THE INVENTION AND RELATED ART

Conduits of various materials are used to enclose and protect electrical wiring running along the vertical surface of walls. These conduits often junction into an electrical distribution box so that the electrical connections can be made. (See FIG. 1.) The conduits are held securely to the wall by strut straps which wrap around the conduits and are in turn attached to a uni-strut mounting brace or similar support fixture that is affixed to a supporting wall. The uni-strut braces can come in a variety of sizes and with varying depth dimensions between the front surface of the strut and the wall or frame which supports the distribution box.

In order to install the conduits into the panel box, the electrician or craftsman must make several measurements onto the top surface of the panel box to mark the location of each conduit entry hole, so that the top surface of the panel box can be punched or drilled through for receiving the conduit. For example, the electrician must first determine the width of the uni-strut installed above the panel box. The electrician then determines how far out to drill the center of the hole for each conduit, as well as how far apart the conduits must be spaced. These measurements are critical because the conduit must fit up against the strut, and there must be space available for the couplings and hardware to attach the conduit to the panel box. The conduits must be spaced apart laterally so that there is ample room for each conduit going into the panel box.

A tool is needed to eliminate the repetitive measuring and mathematical calculations required to mark the centerline locations of the conduit entry holes on the distribution box for each conduit. Such a tool would simplify the task, increase the efficiency of the electrician, increase the accuracy of conduit placement, and reduce the waste resulting from inaccurately punched or drilled conduit entry holes

SUMMARY OF THE INVENTION

In light of the problems and deficiencies inherent in the prior art, the present invention seeks to overcome these by providing a tool for measuring and marking conduit entry holes in a distribution box. The tool includes a rectangular ruler having a short edge attachment groove proximal to a short edge of the ruler which is configured for engagement by a locking assembly. The tool also includes a handle having a tip face and a side face, and a side face locking assembly that can be slidably engaged into the short edge attachment groove. Engagement of the side face locking assembly into the short edge attachment groove couples the handle to the ruler and facilitates the measurement and marking of a depth dimension and a lateral location of one or more conduit entry holes on the distribution box.

In accordance with the invention as embodied and broadly described herein, the present invention also resides in a measurement and marking tool that includes a ruler having first and second attachment grooves that are proximal to two corresponding orthogonal edges, with each groove being configured for engagement by a locking assembly. The tool further includes a handle having a side face with a side locking assembly that is configured for slidable engagement to an attachment groove, and a tip face orthogonal to the side face and having a tip locking assembly that is also configured for slidable engagement to an attachment groove. Engagement of the side face locking assembly to the first attachment groove facilitates the measurement and marking of a depth dimension and a lateral dimension, and engagement of the tip face locking assembly in the second attachment groove facilitates extending the mark of the lateral dimension.

In accordance with the invention as embodied and broadly described herein, the present invention further resides in a method of measuring and marking conduit entry hole locations on a distribution box. The method includes obtaining a measurement and marking tool having a handle with a tip face and a side face, and a rectangular ruler having two short edges and two long edges. The method also includes inserting a side face locking assembly of the handle into an attachment groove proximal to a short edge of the ruler to slidably attach the handle to the short edge of the ruler, and sliding the handle along the attachment groove to measure a depth dimension between a conduit section and a distribution box support. The method further includes tightening the side face locking assembly to removably secure the handle to the ruler, positioning the side face of the handle against a side face of the distribution box, and marking the depth measurement and a lateral location of at least one conduit entry hole on the distribution box.

BRIEF DESCRIPTION OF THE DRAWINGS

Features and advantages of the present invention will be apparent from the detailed description that follows, and when taken in conjunction with the accompanying drawings together illustrate, by way of example, features of the invention. It will be readily appreciated that these drawings merely depict representative embodiments of the present invention and are not to be considered limiting of its scope, and that the components of the invention, as generally described and illustrated in the figures herein, could be arranged and designed in a variety of different configurations. Nonetheless, the present invention will be described and explained with additional specificity and detail through the use of the accompanying drawings, in which:

FIG. 4a illustrates a side view of the electricians square handle of FIG. 2;

FIG. 4b illustrates an end view of the electricians square handle of FIG. 2;

FIG. 4c illustrates a top view of the electricians square handle of FIG. 2;

DETAILED DESCRIPTION OF EXEMPLARY EMBODIMENTS

The following detailed description makes reference to the accompanying drawings, which form a part thereof and in which are shown, by way of illustration, various representative embodiments in which the invention can be practiced. While these embodiments are described in sufficient detail to enable those skilled in the art to practice the invention, it should be understood that other embodiments can be realized and that various changes can be made without departing from the spirit and scope of the present invention. As such, the following detailed description is not intended to limit the scope of the invention as it is claimed, but rather is presented for purposes of illustration, to describe the features and characteristics of the representative embodiments, and to sufficiently enable one skilled in the art to practice the invention. Accordingly, the scope of the present invention is to be defined solely by the appended claims.

Furthermore, the following detailed description and representative embodiments of the invention will best understood with reference to the accompanying drawings, wherein the elements and features of the embodiments are designated by numerals throughout.

Illustrated in FIGS. 1-17 are several representative embodiments of the Electricians Square of the present invention, which embodiments also include various methods for using the apparatus for measuring and marking conduit entry hole locations on an electrical distribution box or cabinet. As will be described herein below, the electricians square provides several significant advantages and benefits over prior related devices and methods for measuring and marking conduit entry holes on a distribution box. However, the recited advantages are not meant to be limiting in any way, as one skilled in the art will appreciate that other advantages may also be realized upon practicing the present invention.

Figure 1:
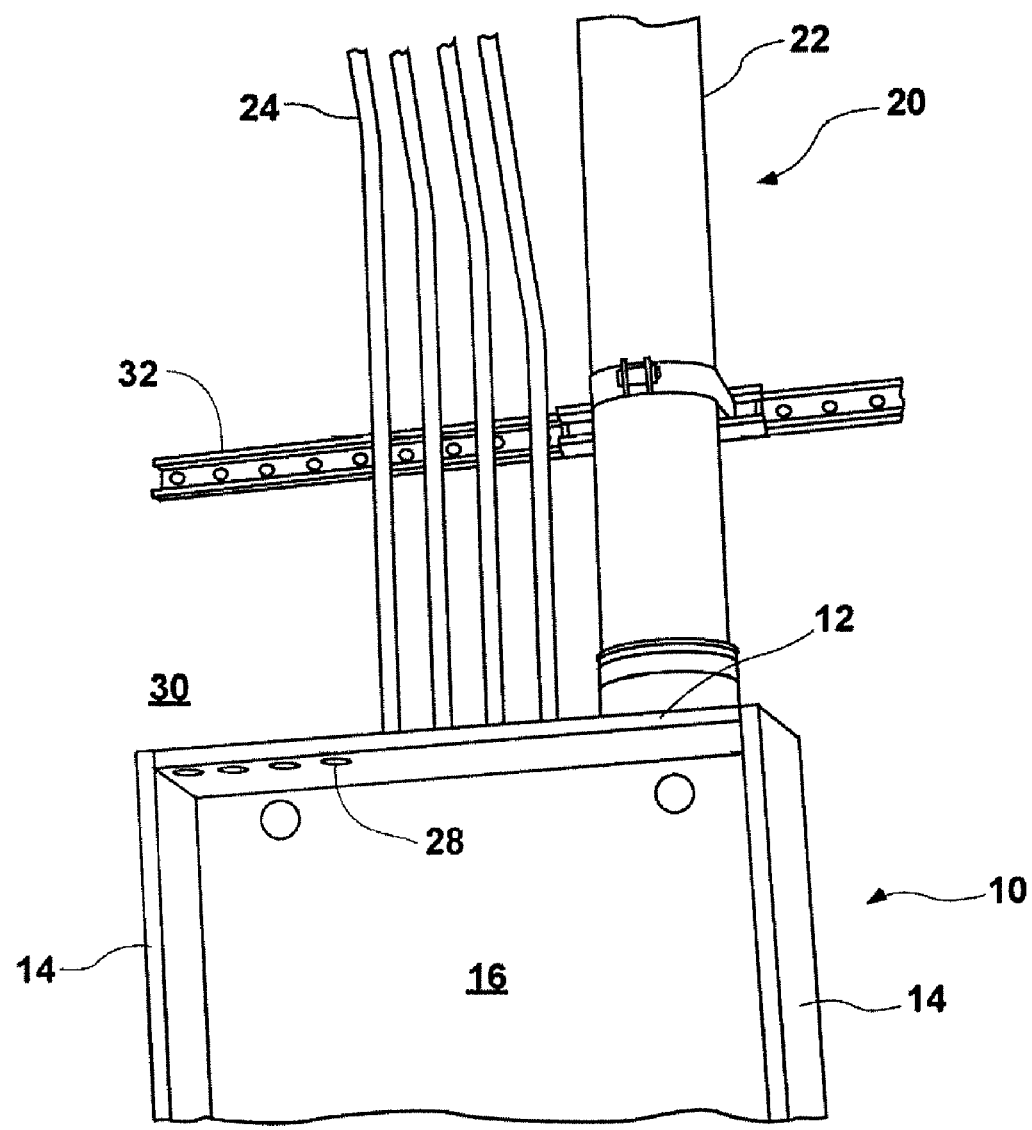
FIG. 1 illustrates an exemplary electrical distribution box with conduit runs connected to a top panel of the distribution box.

FIG. 1 shows an exemplary electrical distribution cabinet or box 10 with conduit runs 20 connected to a top panel 12 of the distribution box, as is common to the industry and well-known to one of skill in the art. The conduit runs 20 can include a wide range of conduit diameters as needed to support and protect the various electrical pathways or cabling entering and leaving the distribution box, including power lines and electrical or optical signal cables, control cables, and/or network cables, etc. For instance, the conduit runs can include both large diameter conduits runs 22 and small diameter conduit runs 24, as well as many intermediate sizes not shown. Furthermore, the conduit runs 20 can include both rigid and flexible conduit and can be made from various materials, including but not limited to metals, such as aluminum or steel, plastic, and fiber-reinforced composites, etc. While the conduit runs 20 are shown entering the distribution box 10 through the top panel 12, it is to be appreciated that other arrangements are also possible, including entering the electrical distribution cabinet or box 10 from either side panel 14, from the back panel 16, or from the bottom panel (not shown).

Both the distribution box 10 and the conduit runs 20 can be mounted to the same supporting surface 30, such as a solid wall or free-standing frame, etc. While the distribution box can be attached directly to the supporting surface, the conduit runs are often mounted to the supporting surface with an intervening conduit support system, such as a section of uni-strut 32. The uni-strut and associated hardware can provide a more modular, flexible, organized and secure connection between the conduit and the supporting structure, as well as position the conduit runs at a better entry position relative to the box so that the conduit does not enter flush against the back wall of the cabinet. However, the uni-strut can also be provided in a variety of different dimensions and configurations that can make it difficult and time consuming for craftsmen to align the conduit entry holes 28 into the cabinet with the uni-strut section above, so that the conduit runs 20 are properly aligned and perpendicular to the entry panel 12 of the distribution box 10.

Figure 2:
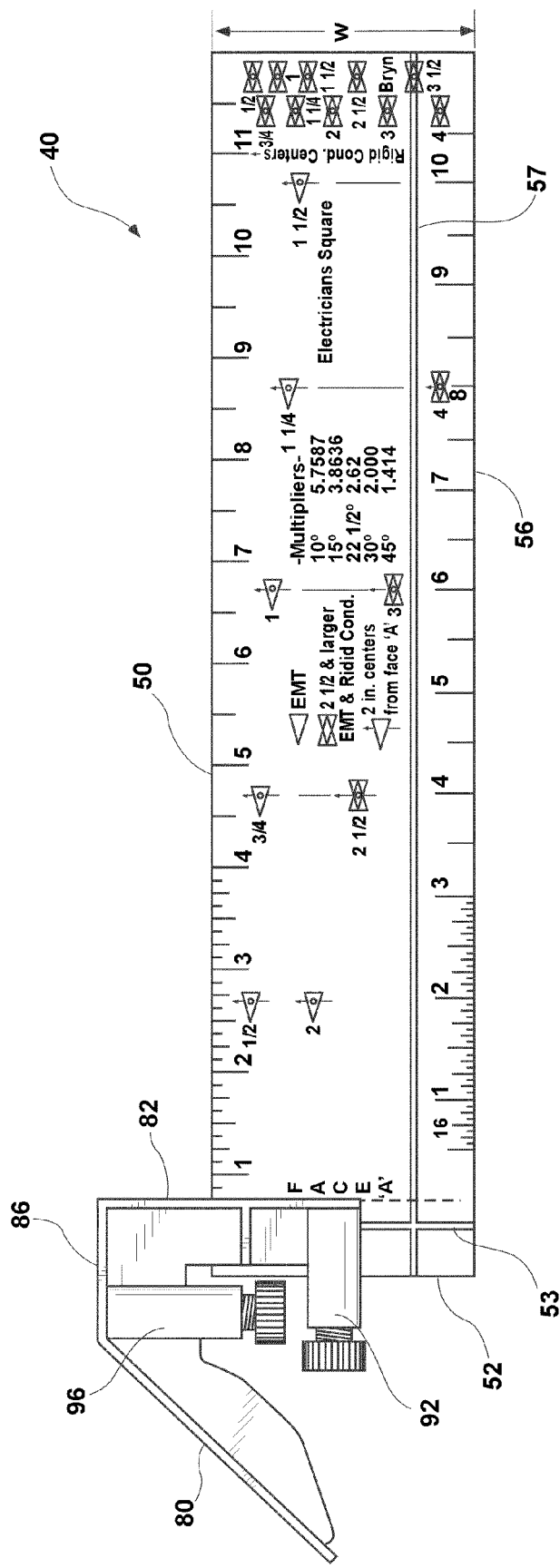
FIG. 2 illustrates a side view of an electricians square including a ruler and a handle, in accordance with one representative embodiment of the present invention.

The Electricians Square of the present invention can be used to better measure and mark the location of the conduit entry holes into the distribution box. As illustrated in FIG. 2, the square or tool 40 can include a rectangular ruler 50 and a handle 80. The rectangular ruler can be made from a variety of materials, including metal, wood or plastic, combinations of metal and plastic, etc., and can have a width dimension "w" that is greater than the width dimension of many of the combination tool rulers found in the prior art. For example, in one representative embodiment the ruler can be 2.5-3.0 inches wide, while many of the combination tool rulers found in the prior art are only 1.0 inches wide.

As can be seen with the representative embodiment of the electricians square or tool 40 generally shown in FIG. 2, the rectangular ruler 50 can include one or more attachment grooves formed into a face of the ruler, and which can provide for the slidable engagement of the ruler to the handle 80 with a locking assembly. One of the grooves, known as the short-edge attachment groove 53, can be formed proximal to the short edge 52 of the rectangular ruler 50. Another groove, known as the long-edge attachment groove 57, can be formed proximal to a long edge 56 of the rectangular ruler.

The handle 80 of the electricians square 40 can include one or more locking assemblies orientated perpendicular to the side face 82 and to the tip face 86 of the handle. For instance, a side face locking assembly 92 can be configured for slidable engagement with the short-edge attachment groove 53, as shown in FIG. 2, while a tip face locking assembly 96 can be configured for slidable engagement with the long-edge attachment groove 57. Like the ruler, the handle 80 can also be made from a variety of components, including metal, plastic, combinations of metal and plastic, and fiber-reinforced composites, etc.

Figure 3A:
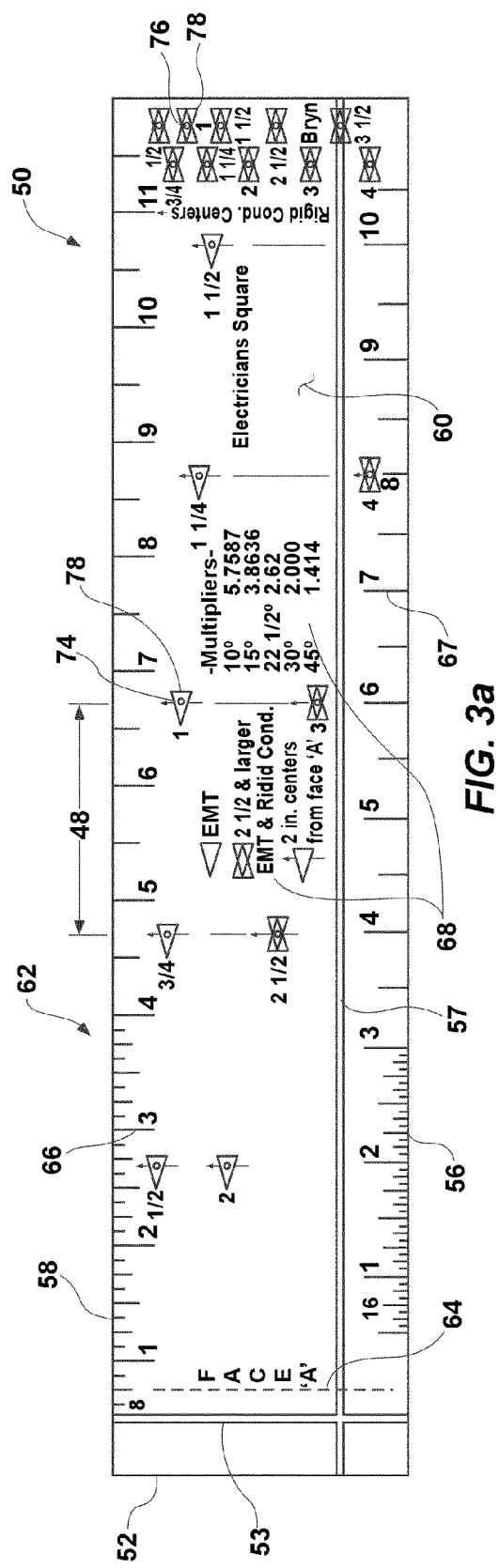
FIG. 3a illustrates a front face of the electricians square ruler of FIG. 2.
Figure 3B:
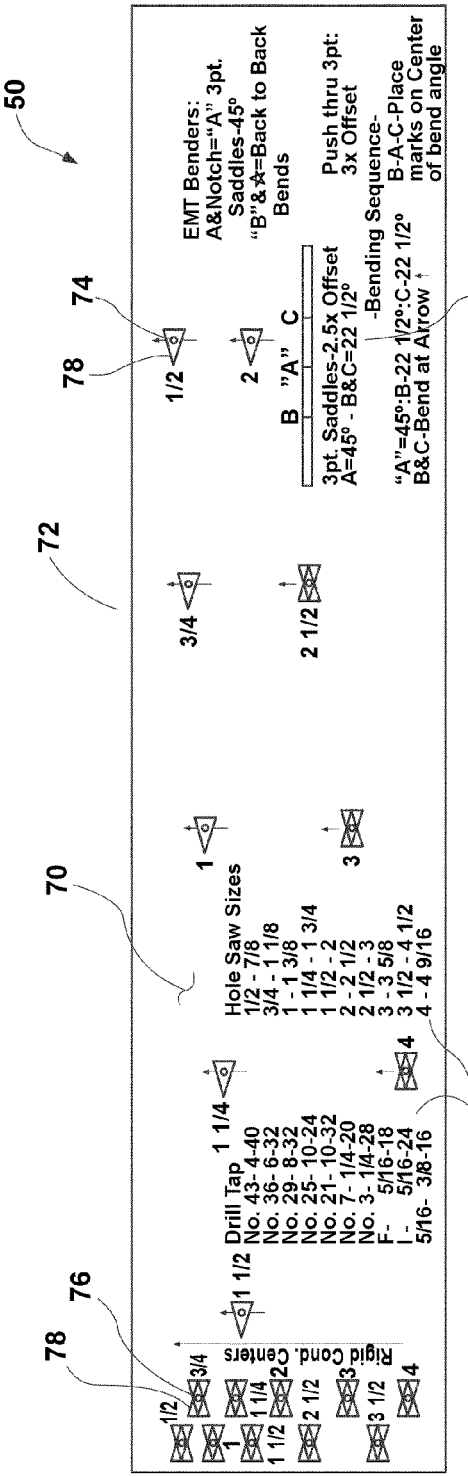
FIG. 3b illustrates a back face of the electricians square ruler of FIG. 2.

The front face 60 and back face 70 of the rectangular ruler 50 are shown in more detail in FIGS. 3a and 3b, respectively. With reference to FIG. 3a, a representative front face template 62 can be formed into the front face 60 of the ruler using a variety of methods and depending upon the material comprising the ruler. For example, if the ruler is made from metal or plastic, the template can be inscribed, cut, pressed, stamped into or painted on the surface of the ruler, etc. Alternatively, if the ruler is made from wood the template can be inscribed, cut into, painted on or glued onto the surface of the ruler, etc. Other ruler materials and methods for forming a template into a surface or face of the ruler can be appreciated by one of skill in the art and can be considered to fall within the scope of the present invention.

The front face template 62 can include linear indicia or a scale 66 along the long or forward marking edge 58 of the ruler opposite the long-edge attachment groove 57, and which can be referenced against the short edge 52 of the ruler proximal to the short-edge attachment groove 53, and can comprise either English and metric scaling in a variety of increments and sub-increments. The front face template can further include linear indicia or a scale 67 along the long edge 56 adjacent the long-edge attachment groove 57 and which can be referenced from the Face 'A' reference line 64 adjacent to the short-edge attachment groove 53, which reference line can correspond with the side face of the handle when the side face locking assembly of the handle is engaged with the short-edge attachment groove. Other arrangements of the linear scales along the long edges of the ruler are also possible.

The front face template 62 can also include a plurality of centerline thru-holes 74, 76 formed through the thickness of the ruler 50 corresponding to the centerlines of the various standard sizes of conduit, and which can be used to locate and mark the centerline locations of the conduit entry holes in the distribution box. As shown in the embodiment of FIG. 3a, centerline thru-holes corresponding to both EMT conduit 74 and rigid conduit 76 can be included in the front face template, since the actual diameters and centerline dimensions of the EMT conduit and rigid conduit are different in the smaller ½ to 2-inch sizes, while being the same in the 2½-inch and larger sizes.

The depth dimension each centerline thru-hole 74, 76 can be referenced against the forward marking edge 58 of the ruler, so that the outside surfaces of each conduit size can align with a referenced line drawn along the marking edge. Thus, each of the thru-holes can be located at a pre-determined centerline distance from the marking edge 58 corresponding to the distance between the outside surface of the conduit and the center of the conduit. Each of the centerline thru-holes 74, 76, moreover, can include indicia 78 that identifies the size of the particular conduit referenced by the thru-hole, which indicia can include both a number corresponding to the standard size of the conduit and a symbol that identifies the type of the conduit, whether rigid or EMT. For instance, as shown in the representative front face template 62 of FIG. 3a, the EMT conduit indicia can include a single triangle shape while the rigid conduit indicia can include a double-triangle shape. It is to be appreciated, moreover, that other shapes and symbols are possible.

In addition to the depth dimension of the centerline thru-holes 74, 76 being referenced against the forward marking edge 58 of the ruler, the lateral dimension of the thru-holes also can be referenced against the side face of the handle when the side face locking assembly of the handle is engaged with the short-edge attachment groove. In this position, the side face of the handle will align with the "Face A" reference line 64 adjacent to the short-edge attachment groove 53, and each of the thru-holes can be laterally separated from each other corresponding to a pre-determined lateral dimension or spacing 48 of the conduits. For example, it is common to space the smaller diameter conduit runs, such as ½, ¾, 1, 1¼ and 1½ inch diameter conduit on 2-inch centers, to provide a neat and uniform spacing to the conduit runs entering the conduit box. The larger diameter conduit runs can be spaced with larger integer multiples of the pre-determined lateral spacing 48, such as 4-inch and 6-inch centers, in order to maintain the uniform and consistent spacing. Thus, as shown in the representative front face template 62 of FIG. 3a, the centerline thru-holes can be laterally separated from each other with a 2-inch spacing to allow the centerlines of the conduit entry holes to spaced on 2-inch centers. If greater spacing is needed to accommodate the larger sized conduit, multiple 2-inch gaps can be used to mark the centerline locations on 4-inch or 6-inch centers.

Also shown in FIG. 3a, the thru-holes 74 marking the centerline locations of ½, ¾, 1, 1¼, 1½, 2, 2¼, 3 and 4 inch EMT conduit can be spaced across the front face 60 of the ruler 50. The centerline depth dimension of each thru-hole can be based upon the diameter of the conduit as referenced against the marking edge 58 of the ruler, and the centerline lateral locations can be aligned on 2-inch spacing as referenced against the Face 'A' reference line 64. The thru-holes 76 marking the centerline locations of ½, ¾, 1, 1¼, 1½, 2, 2¼, 3 and 4 inch rigid conduit can also be spaced across the front face of the ruler, or if desired, grouped together towards the far-side short edge 54 of the ruler 50 (as shown in FIG. 3a) in order to provide the front face template 62 with a cleaner and less-cluttered appearance.

Alternatively, one or more additional lateral thru-slots (not shown) can also be formed through the thickness of the ruler and which can be horizontally aligned adjacent a thru-hole 74 at the same centerline depth dimension as the thru-hole. The laterally-extending thru-slots can facilitate extending a depth reference line 246 (see FIG. 15) in circumstances when the distribution box is so wide that the ruler cannot reach the center when placed against either edge, and in which case the ruler can be removed from the handle and manually aligned with the conduit support reference line 242 extending from both sides of the distribution box.

Referring now to FIG. 3b, the back face 70 of the ruler 50 can also be provided with a back face template 72. The back face template 72 can be different from the front face template, as illustrated in the drawing, or alternatively could be a mirror image of the front face template. In either case, since the thru-holes 74, 76 for marking the centerlines of the different sizes of conduit extend all the way through the thickness of the ruler, it can be beneficial for each thru-hole location to be marked with the same indicia 78 so that the measurement and marking tool can be reversed from one side of the distribution box to the other while providing the same utility.

As can be seen in both FIGS. 3a and 3b, the front face template 62 and back face template 72 can further include instructional indicia 68 that could be useful to the electrician or craftsman involved with laying conduit, mounting distribution and junction boxes, and generally building or installing the mechanical components of an electrical system. The instructional indicia can include, but is not limited to, information relating to the sizes and dimensions of rigid and EMT (flexible) conduit, drill tap sizes, hole saw sizes, or procedures for bending conduit to form a three point saddle (FIG. 3b).

Illustrated in FIGS. 4a-4c are the side, end and top views of the handle 80. The handle can include a side face 82, a tip face 86 and an angled face 88 that together can serve as reference faces for the measurement and marking tool of the present invention. A side face locking assembly 92 can extend perpendicularly inwards toward the center of the handle from the side face 82, and a tip face locking assembly 96 can extend perpendicularly inwards toward the center of the handle from the tip face 86.

In the representative embodiment 80 illustrated in FIGS. 4a-4c, the locking assemblies 92, 96 can comprise spring-loaded thumb locking screws, which are well-known in the art and traditionally used with combination tools to secure a ruler with linear attachment grooves to a handle. For instance, both of the side face 92 and tip face 96 locking assemblies can include, respectively, a notched tip 93, 97 situated in slot 94, 98 that slidably holds and orientates an edge of the ruler. The notched tips 93, 97 can have projecting blade surfaces which can be slidably engaged within the attachment grooves formed into the surface of the ruler, and which can be tightened or loosened by rotating thumb screws 95, 99 to move the notched tips inward or outward within the slots 94, 98. However, it is to be appreciated that other locking mechanisms and methods which could also be used to secure the notched ruler to the handle are known in the art, and are considered to fall within the scope of the present invention.

Further shown in FIG. 4b is a handle scale 84 that can be formed into the side face 82 of the handle 80, and which can be referenced off the plane of the tip face 86. Thus, the handle scale 84 can be used to position and align the forward marking edge of the ruler at a desired offset from the tip face of the handle. If the depth dimension of the uni-strut conduit support relative to the distribution box support is known, the handle scale allows the ruler and handle to be positioned relative to each other and coupled together for marking the conduit support reference line and centerline locations of the conduit entry holes without direct measurement of the uni-strut, providing additional options to the user of the electricians tool for marking conduit entry hole locations into distribution boxes, junction boxes, and other electrical cabinetry.

Figure 5:
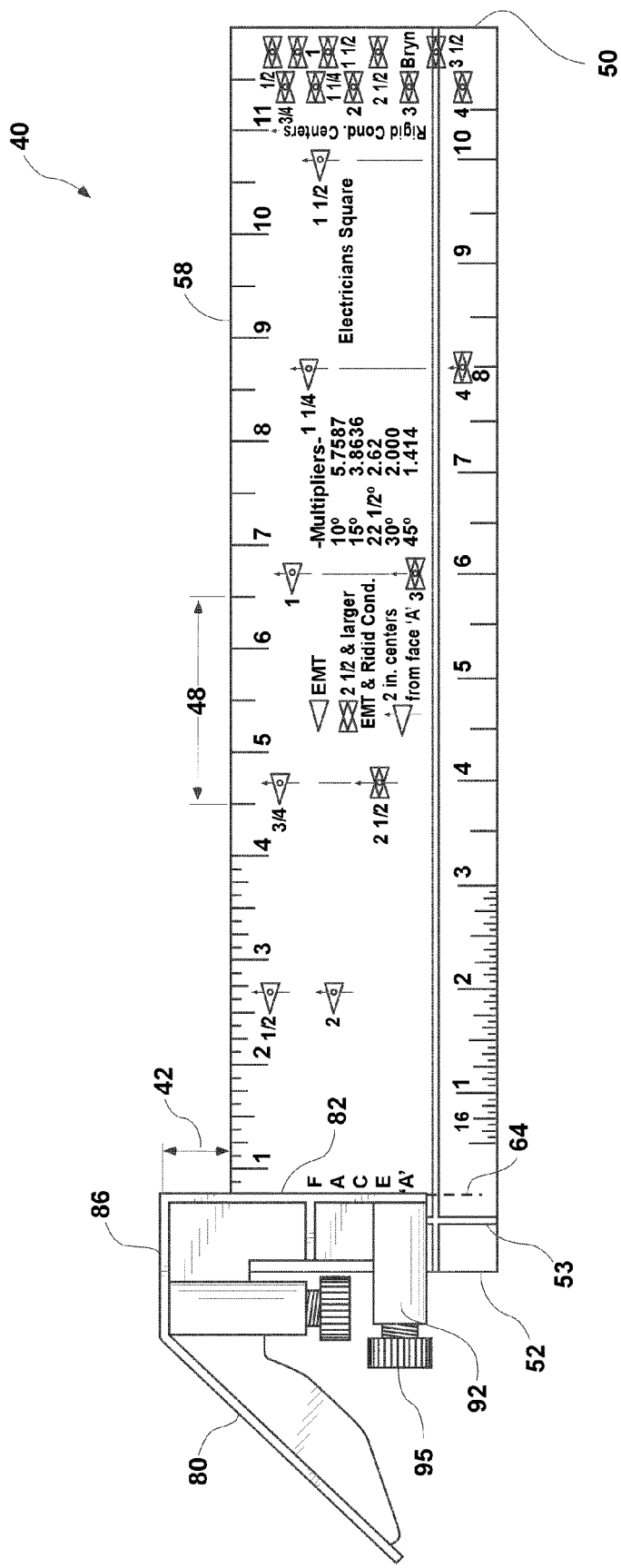
FIG. 5 illustrates a side view of the electricians square of FIG. 2 with the handle attached to the short edge groove of the ruler.
Figure 6:
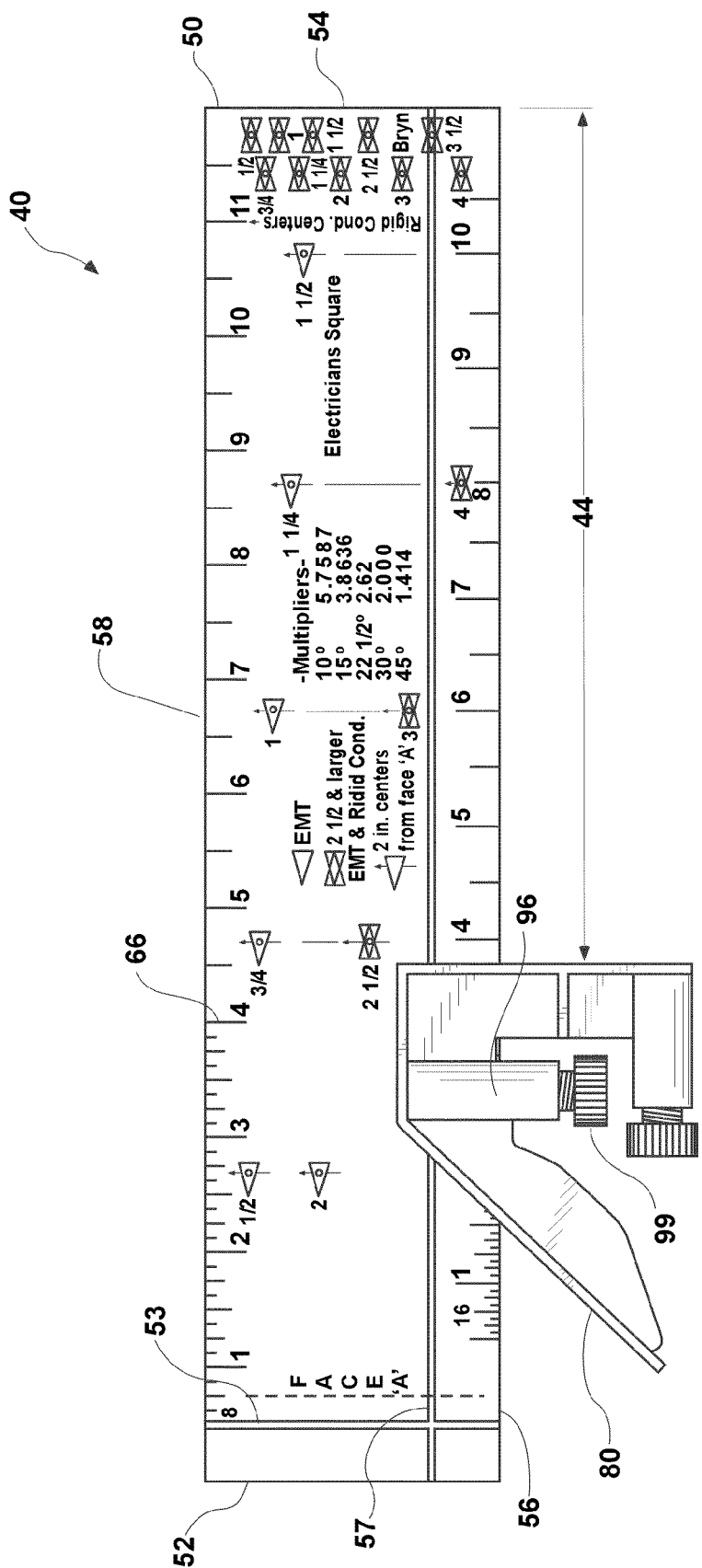
FIG. 6 illustrates a side view of the electricians square of FIG. 2 with the handle attached to the long edge groove of the ruler in a right-hand facing position.
Figure 7:
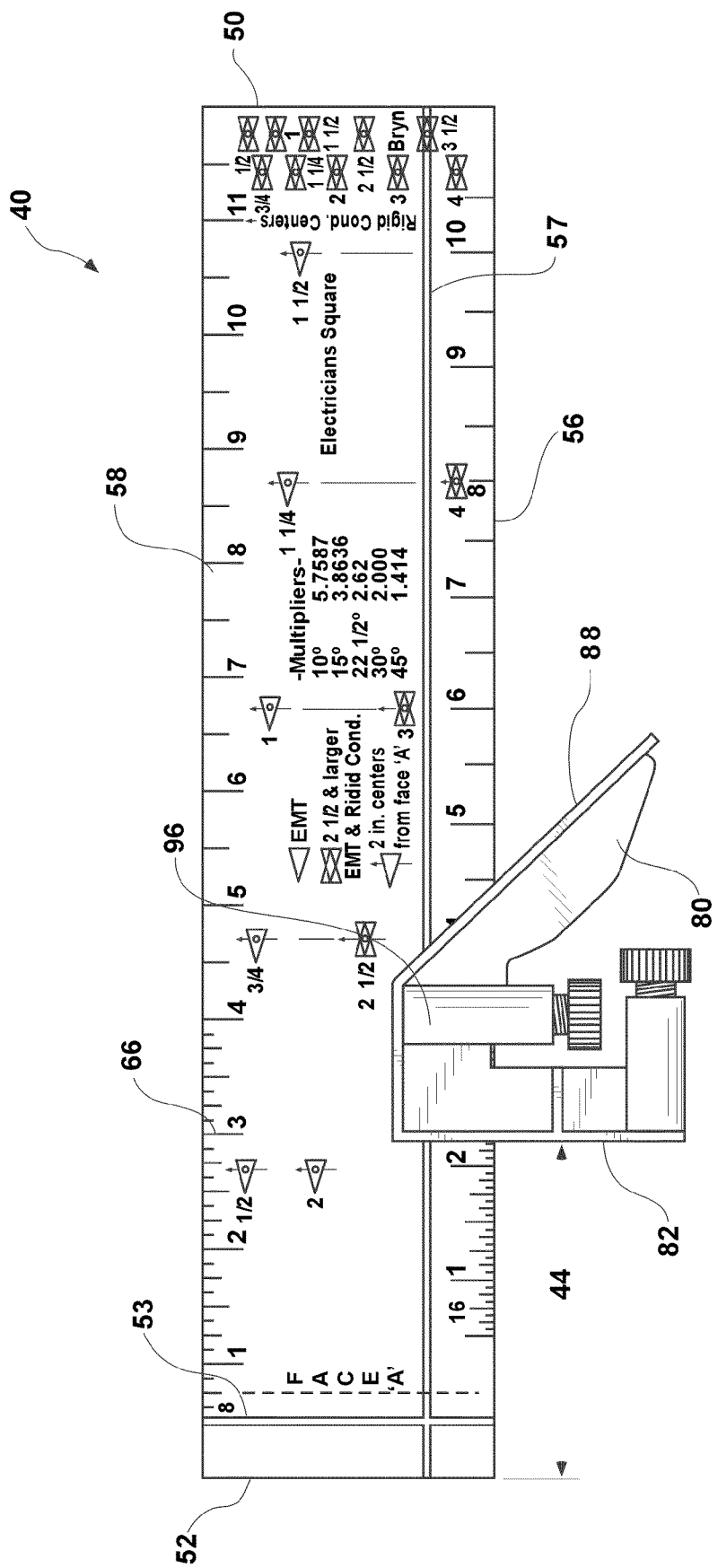
FIG. 7 illustrates a side view of the electricians square of FIG. 2 with the handle attached to the long edge groove of the ruler in a left-hand facing position.

Referring now to FIGS. 5-7, the handle 80 can be coupled to the ruler 50 in variety of positions to create multiple configurations of the electricians square 40. As shown in FIG. 5, the handle can be slidably attached to the short edge 52 of the ruler by engaging the side face locking assembly 92 with the short edge attachment groove 53. In this position the side face 82 of the handle can be aligned with the FACE 'A' reference line 64, so that when the side face 82 of the handle is abutted against a side face of a distribution box, the centerline thru-holes are spaced apart over the top panel of the distribution box in accordance with the pre-determined spacing 48. With the electricians tool 40 configured with English units, as shown, this spacing can be 2-inch centers.

Also shown in FIG. 5, the forward marking edge 58 of the ruler 50 can be parallel to but offset from the plane of the tip face 86 of the handle by depth dimension 42. As the handle 80 can slide forward and backward along the short-edge attachment groove 53, the depth dimension 42 can be continuously adjusted until the side face locking assembly is tightened, such as by turning thumb screw 95.

FIG. 6 illustrates a second configuration of the Electricians Square 40 in which the handle 80 can be slidably attached to the long edge 56 of the ruler by engaging the tip face locking assembly 96 with the long-edge attachment groove 57. In this configuration the linear indicia 66 along the forward marking edge 58 of the ruler 50 opposite the long-edge attachment groove can be referenced against the short edge 52 of the ruler proximal to the short-edge attachment groove 53. As the handle 80 can slide forward and back along the long-edge attachment groove 57, the lateral dimension 44 between the side face 82 of the handle and the short edge 54 of the ruler opposite the short-edge attachment groove 53 can be adjusted until the tip face locking assembly 96 is tightened, such as by turning thumb screw 99.

FIG. 7 illustrates yet another configuration of the electricians square 40 in which the handle 80 can be slidably attached to the long edge 56 of the ruler by engaging the tip face locking assembly 96 with the long-edge attachment groove 57, but in an orientation that is reversed in relation to the orientation of the handle shown in FIG. 5. This position allows the angled face 88 of the handle 80 to project underneath the long edge of the ruler 56 proximal to the long-edge attachment groove, which can be useful in marking corners or the finding the tangent on a round pipe. Similar to FIG. 6 above, the handle 80 can slide forward and back along the long-edge attachment groove 57 to adjust the lateral dimension 44 between the side face 82 of the handle and the short edge 52 proximal the short-edge attachment groove 53 until the tip face locking assembly 96 is tightened.

With the handle 80 coupled to the ruler 50 through engagement of the handle's tip face locking assembly 96 with the long-edge attachment groove 57 (as shown in either of FIG. 6 or FIG. 7), the linear indicia or a scale 66 along the marking edge 58, along with the angled and side faces of the handle, can be used as the measurement and marking system of a traditional combination square. This can be beneficial to the user of the present invention, since the representative embodiment 40 of the Electricians Square could be used to replace the traditional combination square which has been identified as a necessary tool for electricians and skilled craftsman and which is often provided in electricians tool kits. Thus, an electrician or craftsman desiring to use the present invention for measuring and marking conduit entry hole locations would not be required to add another tool to his list of supplies, but instead could simply replace his existing combination square with the Electricians Square 40 which can provide the functionality of both tools.

Figure 8:
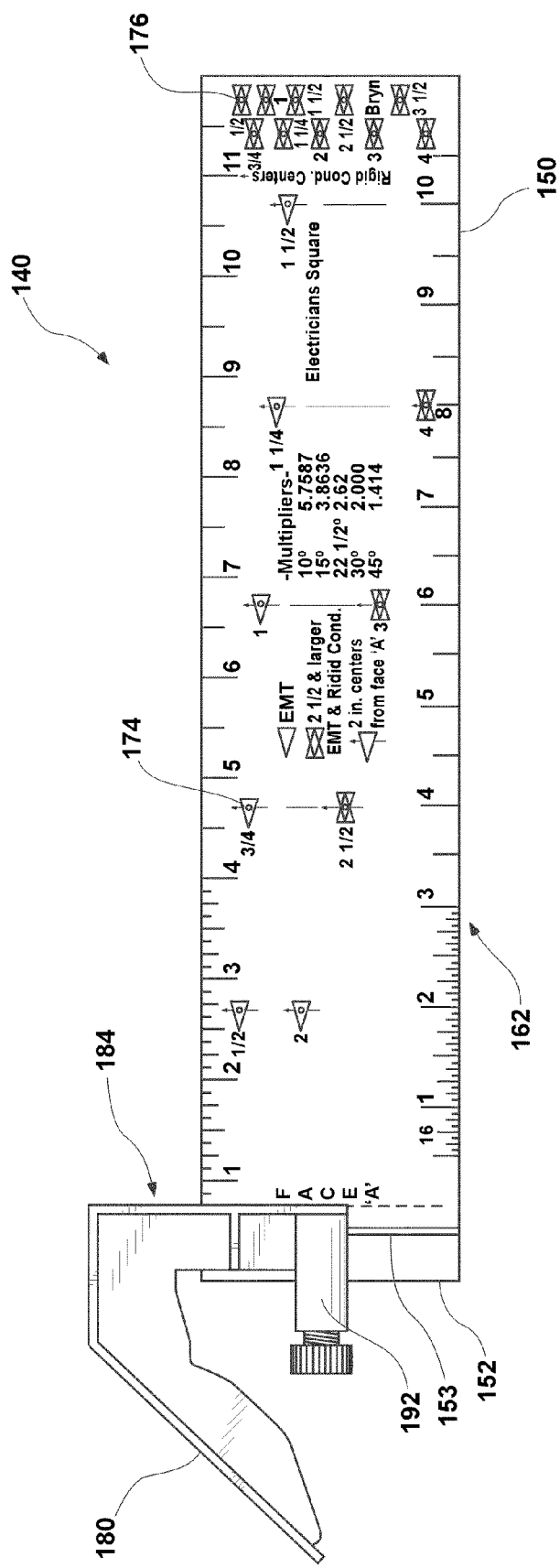
FIG. 8 illustrates a side view of an electricians square, in accordance with another representative embodiment of the present invention.

Illustrated in FIG. 8 is a side view of an electricians square 140 in accordance with another representative embodiment of the present invention, in which the ruler 150 can have only one attachment groove 153 proximal to the short edge 152 of the ruler, and in which the handle 180 can have only one locking assembly 192 extending perpendicularly inward from the side edge 182 of the handle. The side face locking assembly 192 can be configured for slidable engagement with the short-edge attachment groove 153. Many of the features described hereinabove, such as the front face template 162 and thru-holes 174, 176 formed in the ruler, as well as the handle scale 184 formed into the side face 182 of the handle, can be included in the embodiment 140 of the electricians square shown in FIG. 8. Thus, it is to be appreciated that the slidable engagement of the side face locking assembly 192 to the short-edge attachment groove 153 can allow the representative embodiment 140 to be used to measure and mark the depth dimensions and a lateral locations of conduit entry holes on the distribution box, while a different marking tool, such as a standard machinists or carpenters square, can be used to extend the markings of the lateral location to better locate the centerlines of the conduit entry holes into the distribution box, if necessary.

Figure 9:
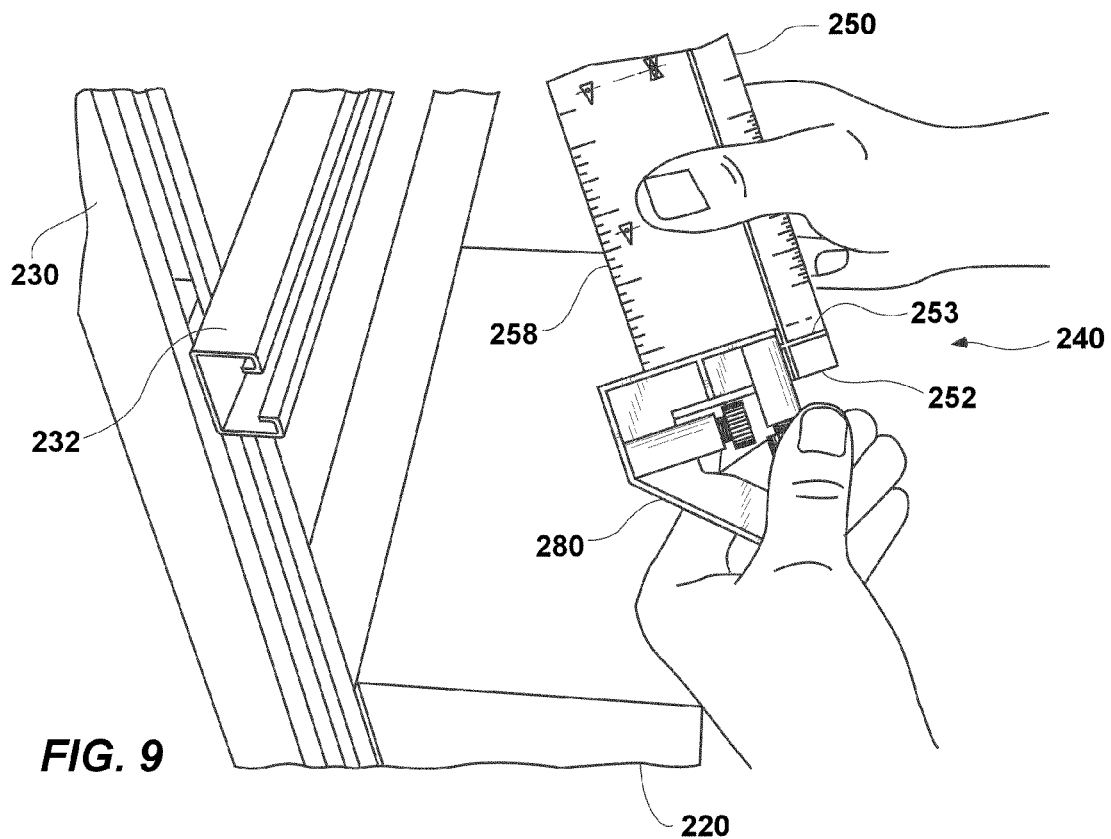
FIG. 9 illustrates the operation of slidably attaching the handle to the short edge of the ruler, in accordance with an embodiment of the present invention.
Figure 10:
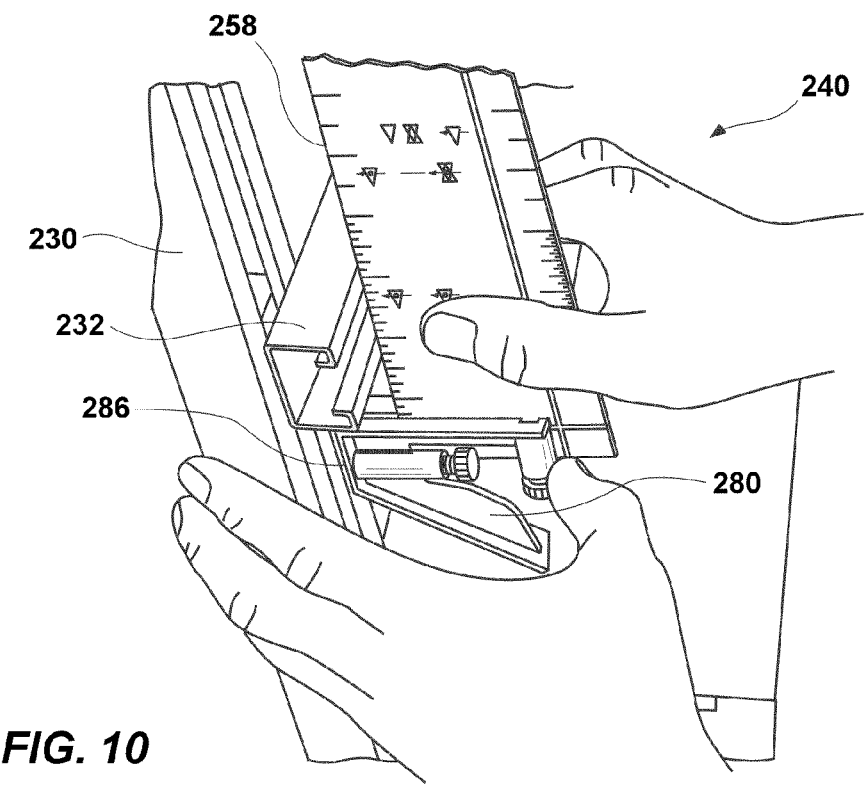
FIG. 10 illustrates the operation measuring a depth dimension between a conduit support and a distribution box support, in accordance with an embodiment of the present invention.

Referring now to FIGS. 9-16, shown therein are several steps or operations in which a representative embodiment of the electricians square 240 can be used for measuring and marking conduit entry hole locations on a distribution box 220, such as an electrical junction box or cabinet. For instance, illustrated in FIG. 9 is the operation of slidably attaching the handle 280 to the short edge 252 of the ruler 250 by inserting the side face locking assembly 292 into the short-edge attachment groove 253. As shown in FIG. 10, the forward long edge 258 of the ruler can then be placed against a conduit support or section of uni-strut 232 which will be supporting the conduit runs, and the handle 280 moved or slid along the short-edge attachment groove until the tip face 286 butts up against the solid wall or free-standing frame 230 supporting the distribution box, to measure the depth dimension between the conduit support 232 and the distribution box support 230.

Figure 11:
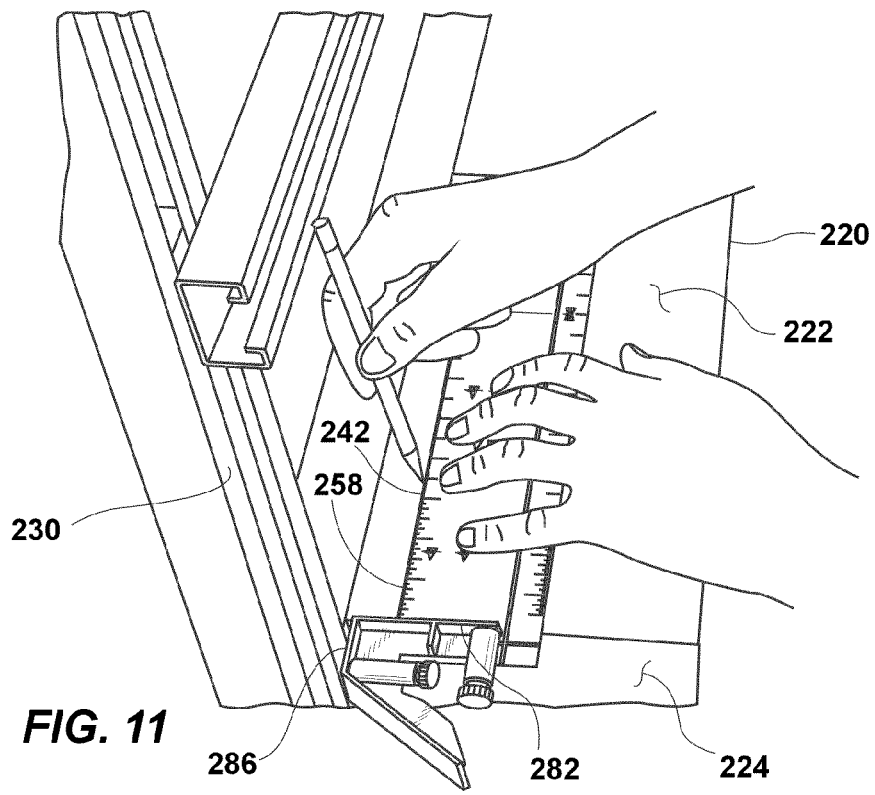
FIG. 11 illustrates the operations of positioning the square against a side face of the distribution box and marking the depth dimension between a conduit support and a distribution box support, in accordance with an embodiment of the present invention.
Figure 12:
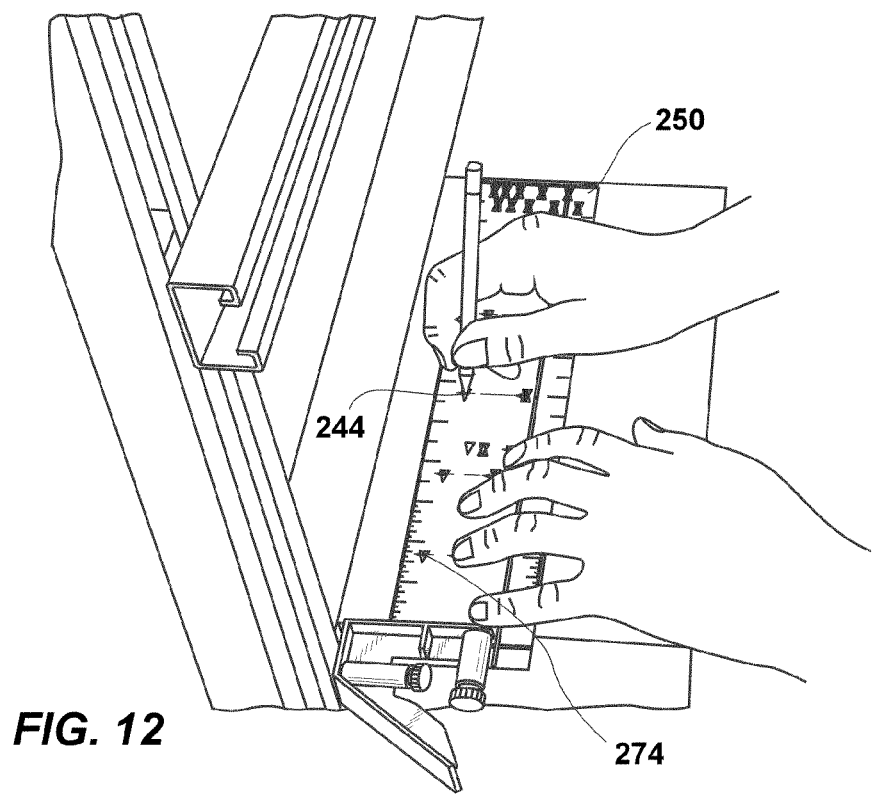
FIG. 12 illustrates the operations of positioning the square against a side face of the distribution box and marking the depth and lateral dimensions of the centerline of a conduit entry hole, in accordance with an embodiment of the present invention.

As shown in FIGS. 11 and 12, the side face 282 of the electricians square 240 can then be positioned against a side face 224 of the distribution box 220, and with the tip face 286 of the handle butting against the distribution box support 230. Illustrated in FIG. 11 is the operation of marking the depth dimension between the conduit support reference line 242 and the distribution box support 230 by scribing a line along the forward long edge 258 of the ruler. The conduit support reference line 242 can define the back surfaces of the conduit runs as they entering into the distribution box, and can be orientated so that each conduit run is properly aligned and perpendicular to the entry panel or top face 222 of the distribution box 220.

Illustrated in FIG. 12 is the operation of marking both the depth and lateral dimensions of the centerline of a conduit entry hole by placing a mark through one of the several thru-holes 274 formed into the thickness of the ruler 250. Multiple entry hole centerline locations laterally separated by the pre-determined lateral spacing can be indicated by making marks 244 through multiple thru-holes. In the representative embodiment 240 of the electricians square shown, the centerline thru-holes can be laterally separated from each other with a 2-inch spacing to allow the centerlines of the conduit entry holes to be spaced on 2-inch centers.

If the distribution box 220 has a width that is greater than the length of the ruler 250, the electricians square 240 can be flipped over and the side face 282 of the handle placed against the far side of the distribution box. Furthermore, both the conduit support reference line 242 and the centerline marks 244 can be indicated using the back face of the ruler shown in FIG. 3b, since the centerline thru-holes 274, 276 can be used from both side of the ruler.

Figure 13:
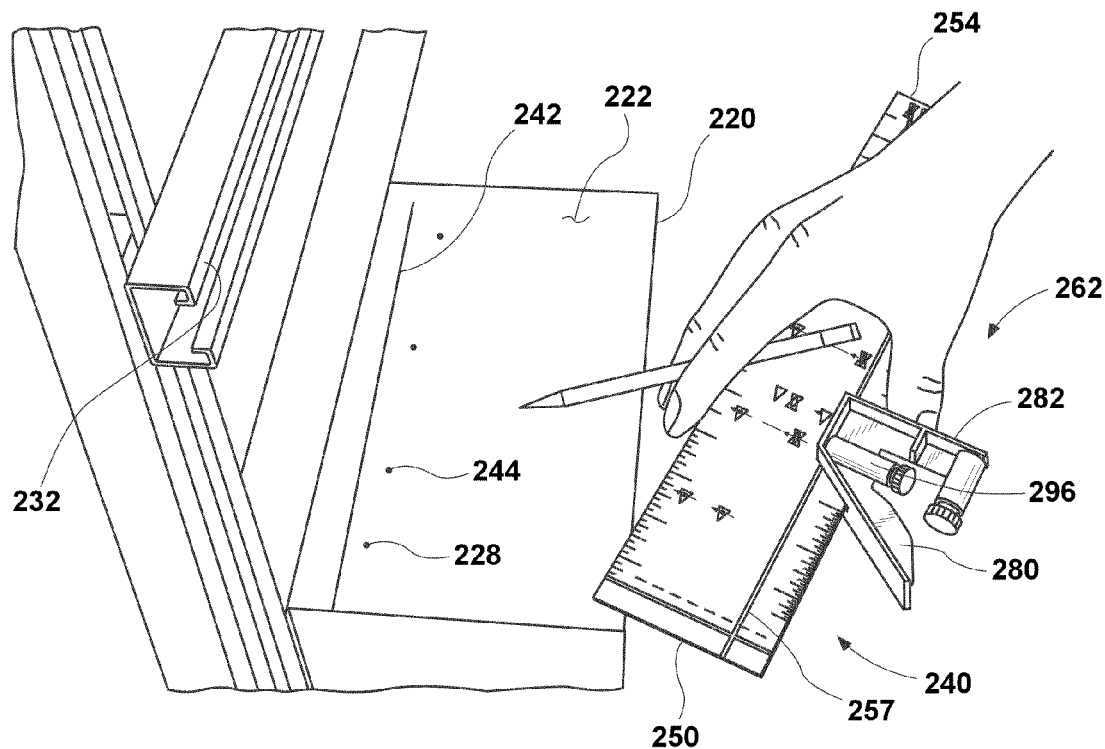
FIG. 13 illustrates the operation of slidably attaching the handle to the long edge of the ruler, in accordance with an embodiment of the present invention.

As can be seen in FIG. 13, the electricians square 240 can be used to mark the top panel 222 of the distribution box 220 with a conduit support reference line 242 that accurately projects the location of the front edge of the conduit support 232 located directly above the distribution box onto the distribution box itself. In one representative embodiment, the conduit support reference line 242 can define the depth dimension of one or more conduit entry holes by providing the reference line against which the back edges of all the entry holes are to be located, and from which the centerline locations of the entry holes can be measured and marked using various techniques known to one of skill in the art.

In another representative embodiment also shown in FIG. 13, the centerline locations of the entry holes can be directly marked 244 using the thru-holes formed through thickness of the ruler 250, to define both the depth dimensions and the lateral locations of the centerlines of one or more conduit entry holes. If the size of the conduit runs and entry-holes of a particular distribution box exactly match the pattern of the thru-holes formed into the ruler 250, then the marks 244 made through the thru-holes can be the exact centerline locations 228 of the conduit entry holes punched or cut into the top panel 222. However, in the more common situation where the arrangement of the conduit runs and entry holes does not match the pattern of the thru-holes in the template 262, the marks 244 can instead be used to define the various offsets or centerline depth dimensions for each size of conduit, as well as the pre-determined lateral spacing between conduit runs. As will be shown in more detail below, the exact centerline locations 228 of the conduit entry holes can be determined using simple marking techniques to extend the marks 244 over the surface of the top panel.

FIG. 13 also serves to illustrate an additional embodiment of the present invention, in which the handle 280 is subsequently removed from the ruler after marking the depth dimension of one or more conduit entry holes, and then the tip face locking assembly 296 is engaged with the long-edge attachment groove 257 to slidably couple the handle to the ruler. The handle can be moved or slid along the long-end attachment groove until distance between the side face 282 of the handle and the far edge 254 of the ruler substantially spans or accommodates the depth dimension of the distribution box 220. The tip face locking assembly 296 can then be tightened to removably secure the handle to the ruler.

Figure 14:
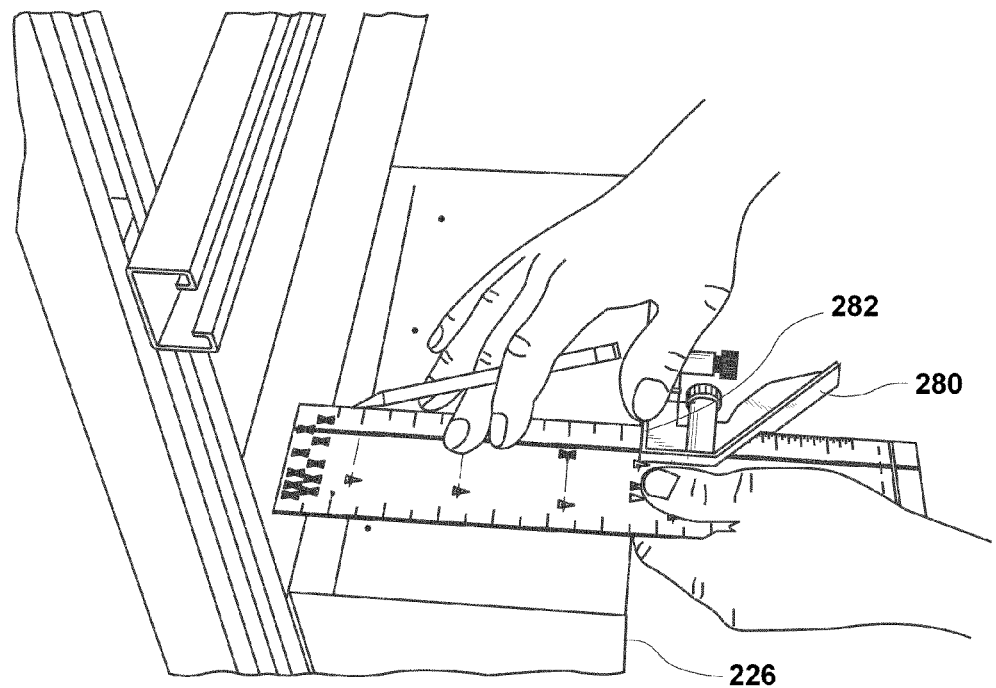
FIG. 14 illustrates the operation of positioning the square against a front face of the distribution box, in accordance with an embodiment of the present invention.
Figure 15:
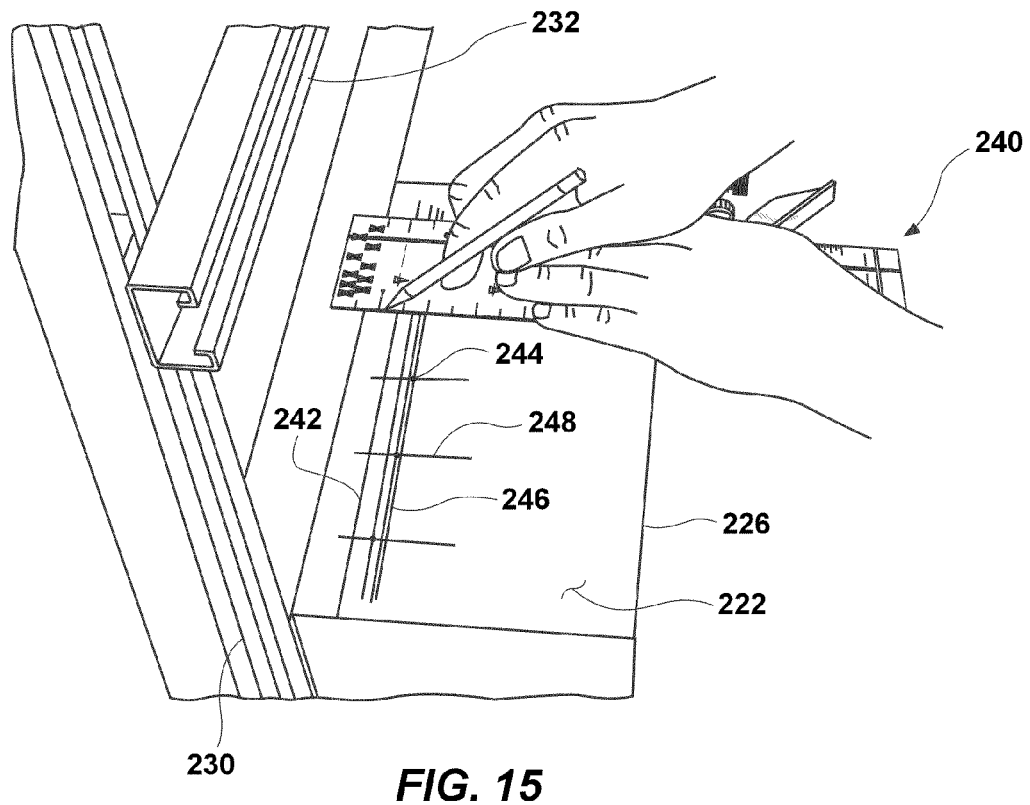
FIG. 15 illustrates the operation of extending the lateral location mark of a conduit entry hole, in accordance with an embodiment of the present invention.
Figure 16:
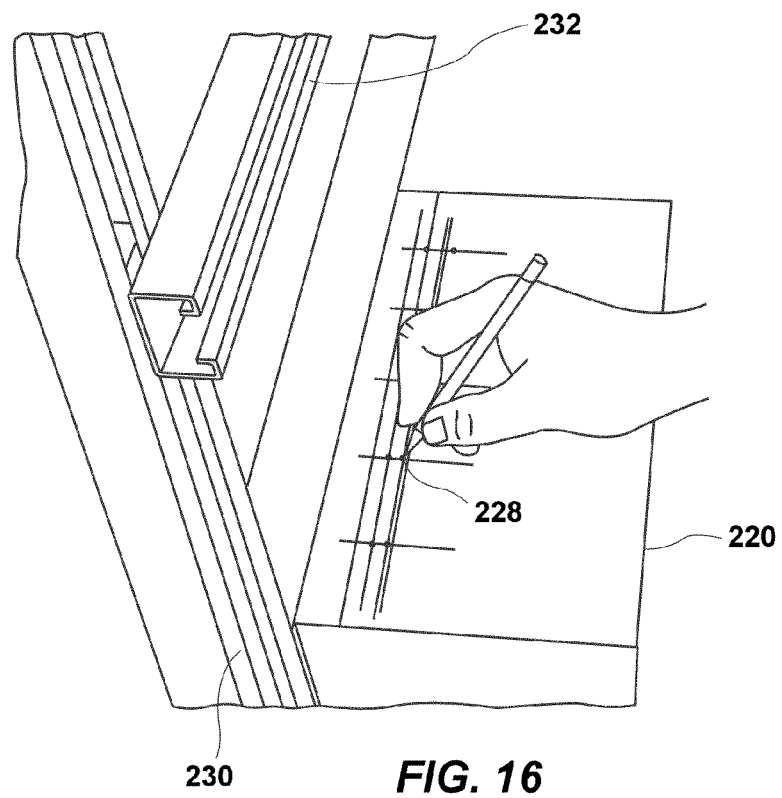
FIG. 16 illustrates marking the location of a conduit entry hole, in accordance with an embodiment of the present invention.

As shown in FIG. 14, the side face 282 of the handle can then be placed against the front face 226 of the distribution box, and then the marks 244 made through the thru-holes can be extended to form lateral reference lines 248 by scribing a line along the depth of the distribution box using a long edge of the ruler (FIG. 15). If additional depth reference lines 246 intersecting the marks 244 had been previously scribed across the width of the top panel 222 using the tool with the handle attached to the short edge of the ruler (as shown in FIG. 11), then the lateral reference lines 248 and depth reference lines 246 will intersect each other to form a grid or pattern of markings made on the top panel 222. As illustrated in FIG. 16, the exact centerline locations 228 of the conduit entry holes can then be indicated by placing a mark at the appropriate grid intersection.

Figure 17:
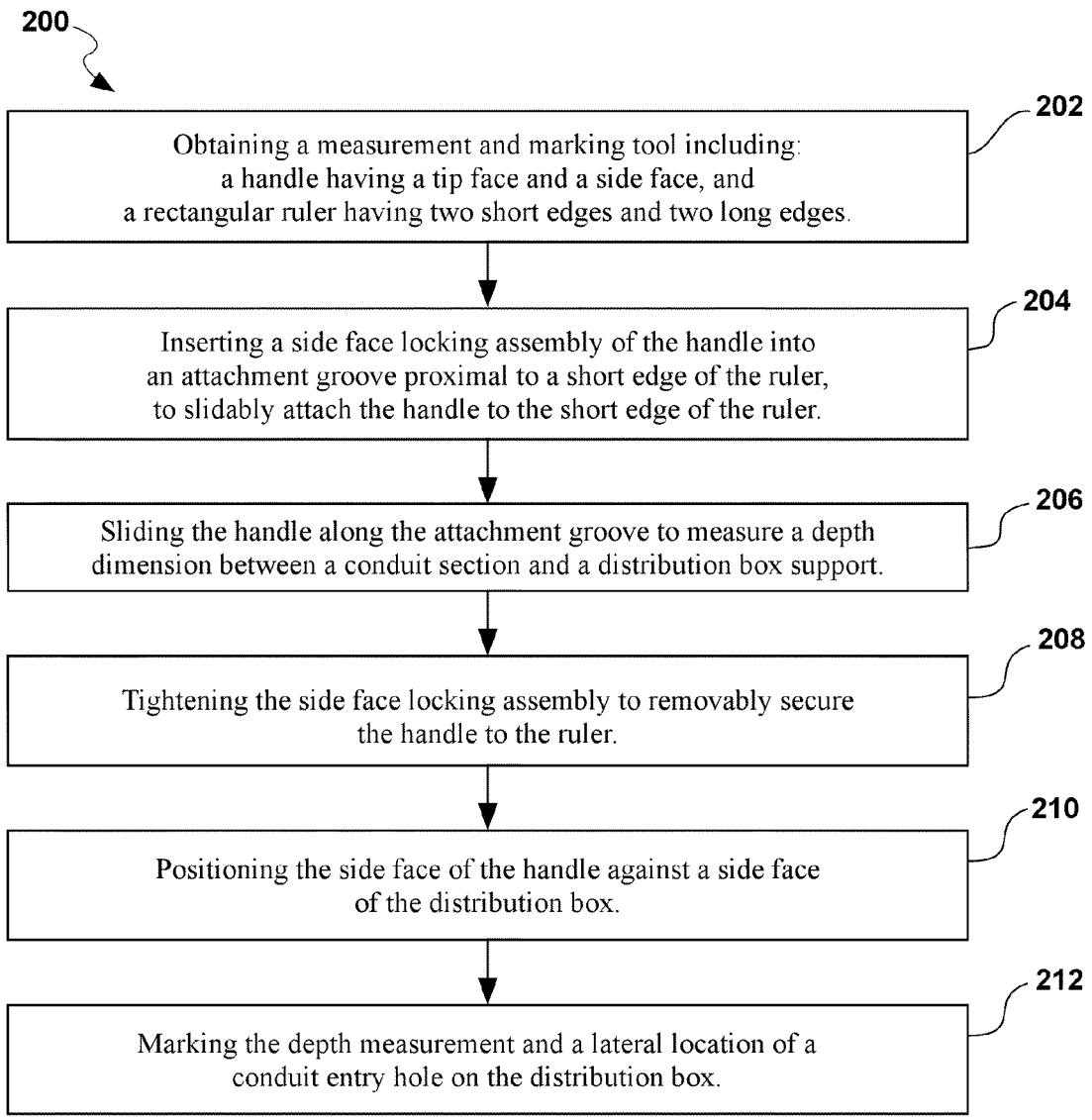
FIG. 17 is a flowchart depicting a method of measuring and marking conduit entry hole locations on an electrical distribution box, in accordance with an embodiment of the present invention.

FIG. 17 is a flowchart depicting a method 200 of measuring and marking conduit entry hole locations on an electrical distribution box, in accordance with another representative embodiment of the electricians square. The method 200 includes obtaining 202 a measurement and marking tool including a handle having a tip face and a side face, and a rectangular ruler having two short edges and two long edges. The method also includes engaging 204 a side face locking assembly of the handle into an attachment groove proximal to a short edge of the ruler, to slidably attach the handle to the short edge of the ruler, and sliding 206 the handle along the attachment groove to measure a depth dimension between a conduit support and a distribution box support. The method further includes tightening 208 the side face locking assembly to removably secure the handle to the ruler, positioning 210 the side face of the handle against a side face of the distribution box, and marking 212 the depth measurement of at least one conduit entry hole on the distribution box.

The foregoing detailed description describes the invention with reference to specific representative embodiments. However, it will be appreciated that various modifications and changes can be made without departing from the scope of the present invention as set forth in the appended claims. The detailed description and accompanying drawings are to be regarded as illustrative, rather than restrictive, and any such modifications or changes are intended to fall within the scope of the present invention as described and set forth herein.

More specifically, while illustrative representative embodiments of the invention have been described herein, the present invention is not limited to these embodiments, but includes any and all embodiments having modifications, omissions, combinations (e.g., of aspects across various embodiments), adaptations and/or alterations as would be appreciated by those skilled in the art based on the foregoing detailed description. The limitations in the claims are to be interpreted broadly based on the language employed in the claims and not limited to examples described in the foregoing detailed description or during the prosecution of the application, which examples are to be construed as non-exclusive. For example, any steps recited in any method or process claims, furthermore, may be executed in any order and are not limited to the order presented in the claims. The term "preferably" is also non-exclusive where it is intended to mean "preferably, but not limited to." Accordingly, the scope of the invention should be determined solely by the appended claims and their legal equivalents, rather than by the descriptions and examples given above.

What is claimed and desired to be secured by Letters Patent is:

1. A tool for measuring and marking conduit entry holes in a distribution box, comprising:
    a rectangular ruler having a short-edge attachment groove proximal to a short edge of the ruler and configured for engagement by a locking assembly;
    a handle including a tip face, a side face, and a side face locking assembly for slidable engagement to the short-edge attachment groove; and
    wherein engagement of the side face locking assembly to the short-edge attachment groove facilitates the measurement and marking of a depth dimension and a lateral location of at least one conduit entry hole on the distribution box.

2. The tool of claim 1, wherein the tip face of the handle extends beyond a long edge of the ruler to measure the depth dimension.

3. The tool of claim 2, wherein the handle comprises a scale formed into the side face for aligning a long edge of the ruler at a pre-determined distance from the tip face.

4. The tool of claim 1, wherein the ruler further comprises a template formed into a face of the ruler for marking a centerline of the at least one conduit entry hole.

5. The tool of claim 4, wherein the template further comprises at least one thru-hole formed through the thickness of the ruler for marking the centerline of the at least one conduit entry hole at a pre-determined distance from the long edge of the ruler.

6. The tool of claim 4, wherein the template further comprises at least two thru-holes formed through the thickness of the ruler having a lateral separation corresponding to a pre-determined distance between centerlines of at least two conduit entry holes.

7. The tool of claim 1, further comprising:
    the rectangular ruler having a long-edge attachment groove proximal to a long edge of the ruler and configured for engagement by a locking assembly;
    the handle including a tip face locking assembly for slidable engagement to the long-edge attachment groove; and
    wherein engagement of the tip face locking assembly to the long-edge attachment groove facilitates extending the mark of the lateral location.

8. A measurement and marking tool, comprising:
    a ruler having first and second attachment grooves proximal to two corresponding orthogonal edges, each groove being configured for engagement by a locking assembly;
    a handle including:
        a side face having a side locking assembly for slidable engagement to first attachment groove; and
        a tip face orthogonal to the side face and having a tip locking assembly for slidable engagement to second attachment groove,
    wherein engagement of the side face locking assembly to the first attachment groove facilitates the measurement and marking of a depth dimension and a lateral dimension; and
    wherein engagement of the tip face locking assembly in the second attachment groove facilitates extending the mark of the lateral dimension.

9. The tool of claim 8, wherein the ruler has a rectangular shape with two short edges and two long edges, with the first attachment groove being proximal to a short edge and the second attachment groove being proximal to a long edge.

10. The tool of claim 9, wherein the tip face of the handle extends beyond a long edge of the ruler to measure the depth dimension when the side face locking assembly is attached to the first attachment groove.

11. The tool of claim 10, wherein the handle comprises a scale formed into the side face for aligning the long edge of the ruler at a pre-determined distance from the tip face.

12. The tool of claim 8, wherein the depth dimension corresponds to a distance between a conduit entry hole in a distribution box and a distribution box support.

13. The tool of claim 8, wherein the lateral dimension corresponds to a pre-determined distance between centerlines of two adjacent conduit entry holes in a distribution box.

14. The tool of claim 8, wherein the side face and tip face locking assemblies further comprise thumb screw locking assemblies.

15. The tool of claim 8, wherein the ruler further comprises a template formed into a face of the ruler for marking a centerline of at least one conduit entry hole in a distribution box.

16. The tool of claim 15, wherein the template further comprises at least one thru-hole formed through the thickness of the ruler for marking the centerline of the at least one conduit entry hole at a pre-determined distance from the long edge of the ruler.

17. The tool of claim 15, wherein the template further comprises at least two thru-holes formed through the thickness of the ruler having a lateral separation corresponding to a pre-determined distance between centerlines of at least two conduit entry holes.

18. A method of measuring and marking conduit entry hole locations on a distribution box, comprising:
    obtaining a measurement and marking tool including:
        a handle having a tip face and a side face; and
        a rectangular ruler having two short edges and two long edges;
    engaging a side face locking assembly of the handle into an attachment groove proximal to a short edge of the ruler, to slidably attach the handle to the short edge of the ruler;
    sliding the handle along the attachment groove to measure a depth dimension between a conduit section and a distribution box support;
    tightening the side face locking assembly to removably secure the handle to the ruler;
    positioning the side face of the handle against a side face of the distribution box; and
    marking the depth measurement of at least one conduit entry hole on the distribution box.

19. The method of claim 18, wherein marking the depth measurement comprises scribing a line along the width of the distribution box using a long edge of the ruler.

20. The method of claim 18, wherein marking the depth measurement comprises marking the centerline location and lateral location of the at least one conduit entry hole using a thru-hole formed through the thickness of the ruler.

21. The method of claim 18, further comprising:
 removing the handle from the ruler;
 engaging a tip face locking assembly of the handle into an additional attachment groove proximal to a long edge of the ruler, to slidably attach the handle to the long edge of the ruler;
 sliding the handle along the additional attachment groove to accommodate a depth of the distribution box;
 tightening the tip face locking assembly to removably secure the handle to the ruler;
 positioning the side face of the handle against a front face of the distribution box; and
 extending the lateral location mark to intersect with the depth measurement mark of the at least one conduit entry hole.

22. The method of claim 21, wherein extending the lateral location mark comprises scribing a line along the depth of the distribution box using a long edge of the ruler.

* * * * *